US012742078B2

(12) United States Patent
Babilo et al.

(10) Patent No.: US 12,742,078 B2
(45) Date of Patent: Sep. 22, 2026

(54) SURFACE TREATMENT FOR ALUMINUM ALLOYS

(71) Applicant: THE BOEING COMPANY, Arlington, VA (US)

(72) Inventors: Peter Babilo, Mission Viejo, CA (US); Giuseppe Russo, Orange, CA (US)

(73) Assignee: The Boeing Company, Arlington, VA (US)

( * ) Notice: Subject to any disclaimer, the term of this patent is extended or adjusted under 35 U.S.C. 154(b) by 49 days.

(21) Appl. No.: 18/613,585

(22) Filed: Mar. 22, 2024

(65) Prior Publication Data

US 2025/0297115 A1 Sep. 25, 2025

(51) Int. Cl.

| | |
|---|---|
| ***C09D 7/62*** | (2018.01) |
| ***B33Y 40/20*** | (2020.01) |
| ***C09D 7/20*** | (2018.01) |
| ***C09D 183/06*** | (2006.01) |
| ***C09J 5/00*** | (2006.01) |
| ***C22C 21/02*** | (2006.01) |
| ***C23C 18/12*** | (2006.01) |

(52) U.S. Cl.

CPC ................. *C09D 7/62* (2018.01); *C09D 7/20* (2018.01); *C09D 183/06* (2013.01); *C09J 5/00* (2013.01); *C22C 21/02* (2013.01); *C23C 18/1254* (2013.01); *B33Y 40/20* (2020.01)

(58) Field of Classification Search

CPC ....... C23C 18/1254; B22F 10/28; B22F 10/62

See application file for complete search history.

(56) References Cited

U.S. PATENT DOCUMENTS

| | | | | |
|---|---|---|---|---|
| 5,789,085 | A * | 8/1998 | Blohowiak | B05D 3/102 428/447 |
| 5,958,578 | A * | 9/1999 | Blohowiak | B32B 15/04 428/416 |
| 11,739,237 | B2 * | 8/2023 | Moore | C09D 1/00 428/447 |
| 2018/0208777 | A1 * | 7/2018 | Schuette | C09D 185/00 |
| 2023/0357592 | A1 | 11/2023 | Schuette | |
| 2023/0357595 | A1 | 11/2023 | Schuette et al. | |

OTHER PUBLICATIONS

Amir Hadadzadeh et al, Columnar to equiaxed transition during direct metal laser sintering of AlSi10Mg alloy: Effect of building direction,Additive Manufacturing,vol. 23, 2018, pp. 121-131.*

3M™ Surface Pre-Treatment AC-130-2, Mar. 2015.*

* cited by examiner

*Primary Examiner* — Alex A Rolland

(74) *Attorney, Agent, or Firm* — Walters & Wasylyna LLC

(57) ABSTRACT

The present disclosure provides methods for enhancing adhesion between an additively manufactured aluminum alloy and an epoxy primer. The methods include performing a surface preparation process on a metal substrate including an aluminum alloy including a columnar structure including an α-aluminum matrix at least partially surrounded by a silicon phase. The methods include dispersing a sol-gel on a surface of the metal substrate. The methods include dispersing a primer on the sol-gel to form a sol-gel coating on the metal substrate.

20 Claims, 7 Drawing Sheets

SURFACE TREATMENT FOR ALUMINUM ALLOYS

FIELD

Aspects of the present disclosure relate to sol-gel coatings and methods of treating surfaces of aluminum alloys using sol-gel coatings.

BACKGROUND

Additive manufacturing (AM) of aluminum alloys has allowed for the production of components having geometric complexity, which otherwise would be unavailable for production due to unsophisticated manifesting equipment or excessive costs. One aluminium alloy, AlSi10Mg, has recently been used to produce components having geometric complexity as the cost of production is low and the components can be made using powder bed laser melting processes.

Unfortunately, AlSi10Mg includes about 9% to about 11% of Si, which causes smutting of the aluminium alloy when exposed to surface pre-treatments, such as sulphurchromic acid (FPL) or ferric sulfate-sulfuric acid (P2) chemical etching, which prepares the surface for application of a structural primer. The smut can lead to incompatibility between the aluminium alloy and the primer, reducing the robustness and reliability of the surface oxide structure growth needed for mechanical interlocking of the primer to the aluminium alloy.

There is a need for improved surface treatment processes in additive manufacturing processes of aluminum alloys to reduce and/or prevent smutting of the aluminum alloy.

SUMMARY

In an aspect, the present disclosure provides methods for enhancing adhesion between an additively manufactured aluminum alloy and an epoxy primer. The methods include performing a surface preparation process on a metal substrate including an aluminum alloy including a columnar structure including an α-aluminum matrix at least partially surrounded by a silicon phase. The methods include dispersing a sol-gel on a surface of the metal substrate. The methods include dispersing a primer on the sol-gel to form a sol-gel coating on the metal substrate.

In another aspect, the present disclosure also provides vehicle components. The vehicle components include a sol-gel coating system. The sol-gel coating system including a metal substrate including AlSi10Mg or Sc—Al—Mg. The sol-gel coating system also includes a sol-gel disposed on the metal substrate. The sol-gel is a reaction product of an organosilane, a zirconium alkoxide, and an organic acid.

In another aspect, the present disclosure also provides assemblies adhesively bonded with a resin. The assemblies including at least two metal substrates aligned to define a bond line. A sol-gel coating is disposed between the at least two metal substrates along the bond line. The coating includes a reaction product of an organosilane, a zirconium alkoxide, and an organic acid. An epoxy adhesive connects the at least two metal substrates.

BRIEF DESCRIPTION OF THE DRAWINGS

So that the manner in which the above recited features can be understood in detail, a more particular description, briefly summarized above, can be had by reference to example aspects, some of which are illustrated in the appended drawings.

FIG. 8A is a picture illustrating a test panel before a thermal shock test. FIG. 8B is a picture illustrating a test panel after a thermal shock test.

DETAILED DESCRIPTION

Figure 1:
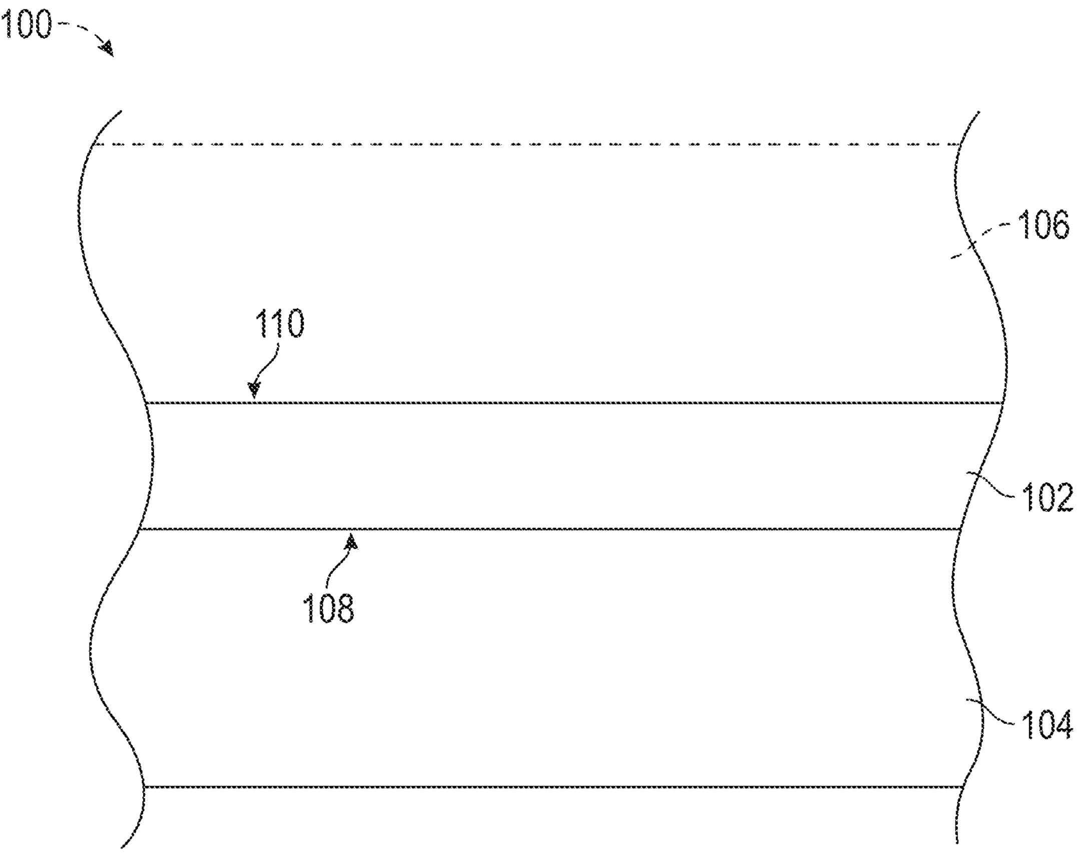
FIG. 1 is a side view of a sol-gel coating disposed on an aluminum alloy metal substrate including a columnar structure consisting of an α-aluminum matrix at least partially surrounded by a silicon phase.

The present disclosure can provide methods of producing additive manufacturing aluminum alloys, e.g., aluminum alloys such as AlSi10Mg, which include a columnar structure having an α-aluminum matrix at least partially surrounded by a silicon phase, having similar strength to conventional aluminum components, without the need for hazardous facilities, e.g., acid etching facilities. The additive manufactured aluminum alloys can be produced such that complex component geometries can be provided, e.g., complex bracket geometries for the bonded socket joints with composite tubes, in a shorter period of time than conventional aluminum alloy production processes. Additionally, by treating the additive manufactured aluminum alloys with a sol-gel of the present disclosure, a reduction and/or elimination of smutting of the additive manufactured aluminum alloys can occur, increasing the compatibility between the aluminium alloy and the primer disposed on the aluminium alloy. By reducing and/or eliminating the smutting of the additive manufactured aluminium alloys, an increase in the robustness and reliability of the mechanical interlocking of the primer to the aluminium alloy can occur by reducing and/or eliminating the use of controlled surface oxide growth.

Sol-Gel Coatings

Sol-gel coatings of metals can achieve resin-to-substrate bonding via chemical linkages (covalent bonds, hydrogen bonds, or van der Waals forces) between a sol-gel and a metal substrate while minimizing environmental impacts otherwise caused by the traditional use of highly diluted hazardous metals. The term "sol-gel," a contraction of solution-gelation, refers to a series of reactions wherein a soluble metal species (typically a metal alkoxide or metal salt) hydrolyze to form a metal hydroxide. The soluble metal species usually contain organic ligands tailored to correspond with the resin in the bonded structure. A soluble metal species can undergo heterohydrolysis and heterocondensation forming heterometal bonds, e.g., Si—O—Zr. The heterometal bonds can form a covalent bond with the additive manufactured aluminum alloy, e.g., AlSi10Mg, to produce a coupled Zr—O—Al or Si—O—Al linkage on the surface of the additive manufactured aluminum alloy. The ratio of organics to inorganics in the matrix is controlled to enhance performance for achieving the resin-to-substrate chemical bonding.

Organosilane: An organosilane useful to form sol-gels of the present disclosure can include a glycidoxy-silane, e.g., 3-glycidoxypropyltrimethoxysilane (GTMS), and/or a hydroxy organosilane. Organosilanes can be substantially unreactive toward corrosion inhibitors. Organosilanes of the present disclosure are represented by formula (I):

(I)

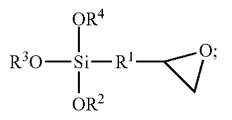

in which, each of $R^2$, $R^3$, and $R^4$ is independently linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl; $R^1$ is selected from alkyl, cycloalkyl, ether, and aryl. Alkyl includes linear or branched $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether For example, organosilanes of the present disclosure can include a hydroxy organosilane. Hydroxy organosilanes of the present disclosure are represented by formula (IA):

(IA)

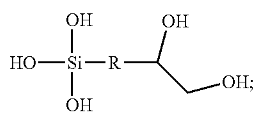

wherein R is selected from alkyl, cycloalkyl, ether, and aryl. Alkyl includes linear or branches $C_{1-20}$ alkyl. $C_{1-20}$ alkyl includes methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and icosanyl. Ether includes polyethylene glycol ether, polypropylene glycol ether, $C_1$-$C_{20}$ alkyl ether, aryl ether, and cycloalkyl ether. In at least one aspect, ether is selected from:

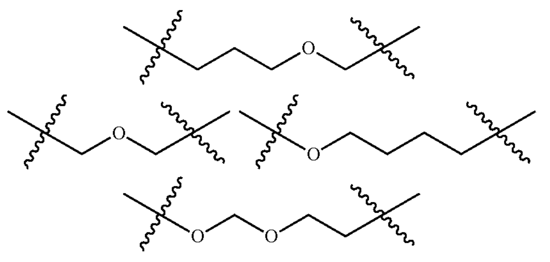

-continued

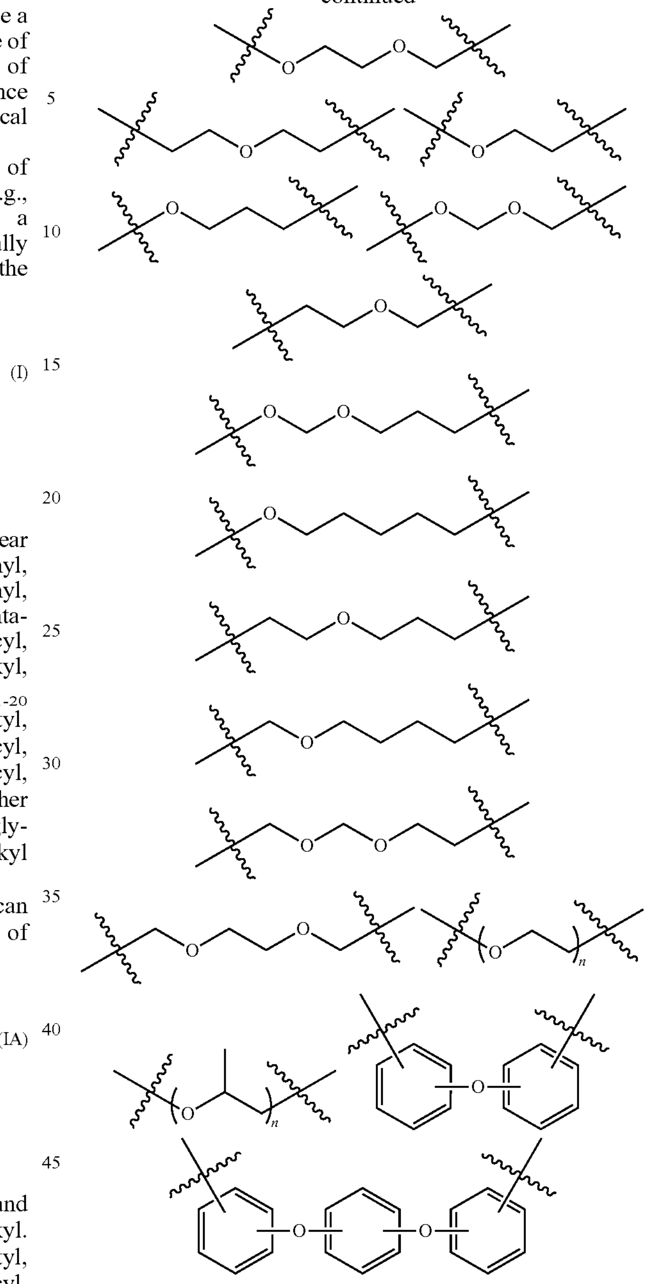

n is a positive integer. In at least one aspect, n is a positive integer and the number average molecular weight (Mn) of the ether is from about 300 to about 500, such as from about 375 to about 450, such as from about 400 to about 425.

Metal alkoxide: A metal alkoxide useful to form sol-gels of the present disclosure provides metal atoms coordinated in a sol-gel for adhesive and mechanical strength. Metal alkoxides of the present disclosure include zirconium alkoxides, titanium alkoxides, hafnium alkoxides, yttrium alkoxides, cerium alkoxides, lanthanum alkoxides, or mixtures thereof. Metal alkoxides can have four alkoxy ligands coordinated to a metal that has an oxidation number of +4. Non-limiting examples of metal alkoxides are zirconium (IV) tetramethoxide, zirconium (IV) tetraethoxide, zirconium (IV) tetra-n-propoxide, zirconium (IV) tetra-isopropoxide, zirconium (IV) tetra-n-butoxide, zirconium (IV) tetra-isobutoxide, zirconium (IV) tetra-n-pentoxide, zirconium (IV) tetra-isopentoxide, zirconium (IV) tetra-n-hexoxide, zirconium (IV) tetra-isohexoxide, zirconium (IV) tetra-n-heptoxide, zirconium (IV) tetra-isoheptoxide, zirconium (IV) tetra-n-octoxide, zirconium (IV) tetra-n-isooctoxide, zirconium (IV) tetra-n-nonoxide, zirconium (IV) tetra-n-isononoxide, zirconium (IV) tetra-n-decyloxide, and zirconium (IV) tetra-n-isodecyloxide.

Corrosion inhibitor: A corrosion inhibitor useful to form sol-gels of the present disclosure provides corrosion resistance of a metal substrate disposed adjacent the sol-gel. Corrosion inhibitors of the present disclosure are compounds having one or more thiol moieties. Without being bound by theory, it is believed that the interaction of thiol moieties of a corrosion inhibitor of the present disclosure with the metal surface (such as an aluminum alloy surface) prevents corrosion of the metal surface. More specifically, interaction of the thiol moieties of a corrosion inhibitor of the present disclosure slows the rate of oxygen reduction, decreasing oxidation of the metal alloy, such as an aluminum alloy including AlSi10Mg.

Corrosion inhibitors of the present disclosure can include organic compounds that can include a disulfide group and/or a thiolate group (e.g., a metal-sulfide bond). In at least one aspect, a corrosion inhibitor is represented by the formula: $R^1—S_n—X—R^2$, wherein $R^1$ is an organic group, n is an integer greater than or equal to 1, X is a sulfur or a metal atom, and $R^2$ is an organic group. One or both of $R^1$ and $R^2$ can include additional polysulfide groups and/or thiol groups. Furthermore, corrosion inhibitors can be polymeric having the formula $—(R^1—S_n—X—R^2)_q—$, wherein $R^1$ is an organic group, n is a positive integer, X is a sulfur or a metal atom, $R^2$ is an organic group, and q is a positive integer. In at least one aspect, $R^1$ and $R^2$ (of a polymeric or monomeric corrosion inhibitor) is independently selected from H, alkyl, cycloalkyl, aryl, thiol, polysulfide, or thione. Each of $R^1$ and $R^2$ can be independently substituted with a moiety selected from alkyl, amino, phosphorous-containing, ether, alkoxy, hydroxy, sulfur-containing, selenium, or tellurium. In at least one aspect, each of $R^1$ and $R^2$ has 1-24 carbon atoms and/or non-hydrogen atoms. For example, heterocyclic examples of $R^1$ and $R^2$ groups include an azole, a triazole, a thiazole, a dithiazole, and/or a thiadiazole.

Corrosion inhibitors can include a metal in a metal-thiolate complex. Corrosion inhibitors can include a metal center and one or more thiol groups (ligands) bonded and/or coordinated with the metal center with a metal-sulfide bond. A thiolate is a derivative of a thiol in which a metal atom replaces the hydrogen bonded to sulfur. Thiolates have the general formula $M-S—R^1$, wherein M is a metal and $R^1$ is an organic group. $R^1$ can include a disulfide group. Metal-thiolate complexes have the general formula $M-(S—R^1)_n$, wherein n generally is an integer from 2 to 9 and M is a metal atom. Metals are copper, zinc, zirconium, aluminum, iron, cadmium, lead, mercury, silver, platinum, palladium, gold, and/or cobalt.

Corrosion inhibitors of the present disclosure include thiadiazoles having one or more thiol moieties. Non-limiting examples of thiadiazoles having one or more thiol moieties include 1,3,4-thiadiazole-2,5-dithiol and thiadiazoles represented by formula (II) or formula (III):

(II)

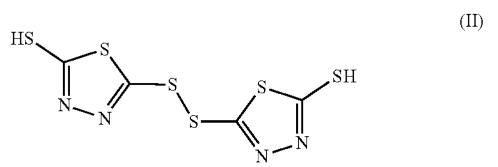

(III)

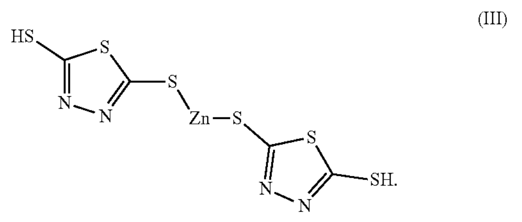

The thiadazole of formula (II) can be purchased from Vanderbilt Chemicals, LLC (of Norwalk, Connecticut) and is known as Vanlube® 829. The thiadiazole of formula (III) can be purchased from WPC Technologies, Inc.™ (of Oak Creek, Wisconsin) and is known as InhibiCor™ 1000.

Acid stabilizer: An acid stabilizer used to form sol-gels of the present disclosure provides stabilization of a metal alkoxide and a corrosion inhibitor of the sol-gel as well as pH reduction of the sol-gel. The pH value of a sol-gel (and composition that forms the sol-gel) can be controlled by use of an acid stabilizer. Acid stabilizers of the present disclosure include organic acids. Organic acids include acetic acid (such as glacial acetic acid) or citric acid. Less acidic acid stabilizers can also be used, such as glycols, ethoxyethanol, or $H_2NCH_2CH_2OH$.

Sol-gel components of the present disclosure, such as corrosion inhibitors, can be dissolved in one or more solvents before being added to a mixture containing other sol-gel components. Corrosion inhibitors, for example, generally have limited solubility in water and aqueous solvents. Corrosion inhibitors can be insoluble powders, insoluble materials (e.g., aggregates, solids, and/or liquids), hydrophobic compounds, heavy oils, and/or greases. Hence, corrosion inhibitors can be dissolved in compatible solvents and can be suspended, emulsified, and/or dispersed within incompatible solutions and/or solvents. Suitable solvents for dissolving, suspending, emulsifying, and/or dispersing sol-gel components of the present disclosure can be aqueous, polar organic, and/or non-polar organic. For sol-gels that are aqueous and/or include an aqueous component, polar organic solvents can be advantageous for dissolving corrosion inhibitors, which are poorly soluble in water, before combination with the other sol-gel components. Additionally or alternatively, a corrosion inhibitor can be suspended, emulsified, and/or dispersed in an aqueous solution prior to combination with sol-gel components. Examples of solvents for dissolving, suspending, emulsifying, and/or dispersing sol-gel components include water, alcohol (e.g., ethanol or propanol), ether (e.g., dimethyl ether or dipropylene glycol dimethyl ether), glycol ether, tetrahydrofuran (THF), N-methyl-2-pyrrolidone (NMP), dimethyl sulfoxide (DMSO), and mixtures thereof. Upon curing, e.g. heating, of a mixture containing the sol-gel components, some or all of the solvent(s) can be removed from the sol-gel/mixture.

Sol-Gel Coated Aluminum Alloys

FIG. 1 is a side view of a sol-gel coating disposed on an aluminum alloy substrate. The aluminum alloy substrate can include AlSi10Mg having about 85 wt % to about 95 wt % aluminum, e.g., about 85 wt % to about 88 wt %, about 88 wt % to about 90 wt %, about 90 wt %, to about 92 wt %, or about 92 wt % to about 95 wt %, about 4 wt % to about 13 wt % silicon, e.g., about 4 wt % to about 8 wt %, about 8 wt % to about 12 wt %, or about 9 wt % to about 13 wt %, and about 1 wt % to about 2 wt % magnesium, e.g., about 1 wt % to about 1.2 wt %, about 1.2 wt % to about 1.4 wt %, about 1.4 wt % to about 1.6 wt %, about 1.6 wt % to about 1.8 wt %, or about 1.8 wt % to about 2.0 wt %. The aluminum alloy substrate can include Sc—Al—Mg, having about 85 wt % to about 95 wt % aluminum, e.g., about 85 wt % to about 88 wt %, about 88 wt % to about 90 wt %, about 90 wt %, to about 92 wt %, or about 92 wt % to about 95 wt %, about 4 wt % to about 13 wt % scandium, e.g., about 4 wt % to about 8 wt %, about 8 wt % to about 12 wt %, or about 9 wt % to about 13 wt %, and about 1 wt % to about 2 wt % magnesium, e.g., about 1 wt % to about 1.2 wt %, about 1.2 wt % to about 1.4 wt %, about 1.4 wt % to about 1.6 wt %, about 1.6 wt % to about 1.8 wt %, or about 1.8 wt % to about 2.0 wt %. As shown in FIG. 1, a sol-gel coated aluminum alloy 100 comprises a sol-gel coating 102 disposed on a metal substrate 104. Sol-gel coating 102 can have corrosion inhibiting properties which provide corrosion protection of metal substrate 104. Sol-gel 102 coating promotes adherence between metal substrate 104 and a secondary substrate 106 without smutting of the metal substrate 104. Secondary substrate can be a metal substrate and/or an organic material, e.g., a polymer.

Metal substrate 104 can be any suitable additively manufactured aluminum alloy material, e.g., AlSi10Mg or Sc—Al—Mg. Metal substrate 104 can define one or more components (such as structural or mechanical components) of environmentally exposed apparatuses, such as aircraft, watercraft, spacecraft, land vehicles, equipment, and/or another apparatus susceptible to environmental degradation. Metal substrate 104 can be part of a larger structure, such as a vehicle component. A vehicle component is any suitable component of a vehicle, such as a structural component, such as a panel or joint, of an aircraft, automobile, satellite, spacecraft, etc. Examples of a vehicle component include an auxiliary power unit (APU), a socket joint of a satellite, a socket joint of a spacecraft, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal and/or external component. Metal substrate 104 can be a 'bare' substrate, having no plating (unplated metal), conversion coating, and/or corrosion protection between metal substrate 104 and sol-gel coating 102. Additionally or alternatively, metal substrate 104 can include surface oxidization. Hence, sol-gel coating 102 can be directly bonded to metal substrate 104 and/or to a surface oxide layer on a surface of metal substrate 104, increasing the adhesion between the sol-gel and the metal substrate 104, thereby allowing for metal-to-metal adhesion between two or more metal substrate to increase.

Secondary substrate 106 is disposed on a second surface 110 of the sol-gel coating 102 opposite first surface 108 of sol-gel coating 102. In at least one aspect, sol-gel coating 102 has a thickness that is less than the thickness of metal substrate 104. In at least one aspect, sol-gel 102 has a thickness of from about 500 nm to about 100 μm (microns), such as from about 500 nm to about 600 nm, about 600 nm to about 700 nm, about 700 nm to about 800 nm, about 800 nm to about 900 nm, about 900 nm to about 1 μm, or about 1 μm to about 100 μm. Thinner coatings can have fewer defects (more likely to be defect free), while thicker coatings can provide increased bonding and/or adhesion between the metal substrate and the secondary substrate and/or the sol-gel coating and the metal substrate.

The secondary substrate 106 can be an organic material, e.g., organic chemical compositions, configured to bind and/or adhere to sol-gel coating 102. The secondary substrate 106 can include a paint, a topcoat, a polymeric coating (e.g., an epoxy coating, and/or a urethane coating), a polymeric material, a composite material (e.g., a filled composite and/or a fiber-reinforced composite), a laminated material, or mixtures thereof. The secondary layer 106 can include a polymer, a resin, a thermoset polymer, a thermoplastic polymer, an epoxy, a lacquer, a polyurethane, a polyester, or combinations thereof. The secondary layer 106 can additionally include a pigment, a binder, a surfactant, a diluent, a solvent, a particulate (e.g., mineral fillers), fibers (e.g., carbon, aramid, and/or glass fibers), or combinations thereof.

Methods of Coating Aluminum Alloys with Sol-Gels

Figure 2:
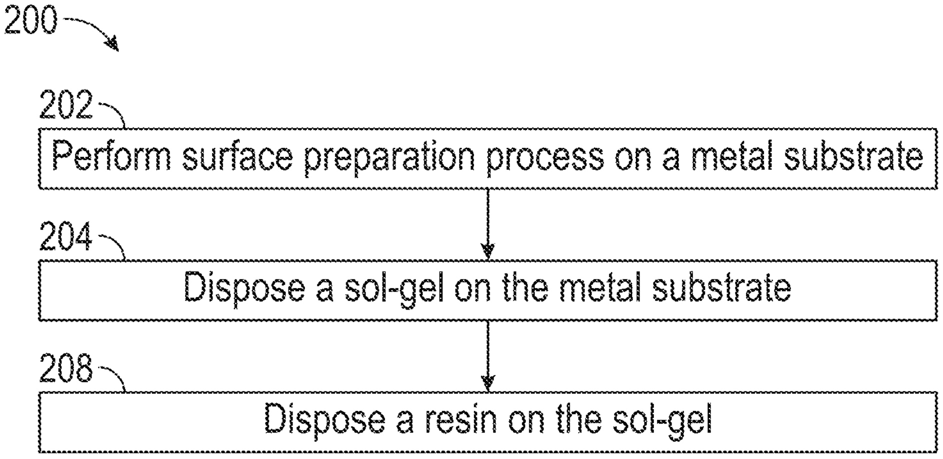
FIG. 2 is a block diagram of the typical steps in the surface treatment process of the present invention.

Now referring to FIG. 2, an aluminum alloy, e.g., AlSi10Mg, was coated with a sol-gel coating of the present disclosure. At operation 202, a surface preparation process can be performed on a metal substrate. The metal substrate can include an aluminum alloy substrate, e.g., AlSi10Mg. The metal substrate can include any suitable length, width, and/or depth to be used as a component for a vehicle, e.g. an aircraft. For example, a metal substrate can include a length of about 3.5 inches to about 4.5 inches, e.g., about 3.5 inches to about 3.75 inches, about 3.75 inches to about 4.0 inches, about 4.0 inches to about 4.25 inches, or about 4.25 inches to about 4.5 inches. As a further example, the metal substrate can include a width of about 0.5 inches to about 1.5 inches, e.g., about 0.5 inches to about 0.75 inches, about 0.75 inches to about 1.0 inches, about 1.0 inches to about 1.25 inches, or about 1.25 inches to about 1.5 inches. As a further example, the metal substrate can include a depth of about 0.05 inches to about 0.3 inches, e.g., about 0.05 inches to about 0.1 inches, about 0.1 inches to about 0.15 inches, about 0.15 inches to about 0.2 inches, about 0.2 inches to about 0.25 inches, or about 0.25 inches to about 0.3 inches. The metal substrate can include a straightness of edge of about 0.01 inches to about 0.02 inches, e.g., about 0.01 inches to about 0.012 inches, about 0.012 inches to about 0.014 inches, about 0.014 inches to about 0.016 inches, about 0.016 inches to about 0.018 inches, or about 0.018 inches to about 0.02 inches, a flatness of about 0.01 inches to about 0.015 inches, e.g., about 0.01 inches to about 0.012 inches, about 0.011 inches to about 0.013 inches, about 0.012 inches to about 0.014 inches, or about 0.013 inches to about 0.015 inches, and a surface finish of about 1 microinch to about 70 microinches, e.g., about 1 microinch to about 20 microinches, about 20 microinches to about 40 microinches, about 40 microinches to about 60 microinches, or about 50 microinches to about 70 microinches. While the present disclosure only recites a few ranges for a length, width, depth, straightness of edge, flatness, and/or surface finish, any number of ranges for a length, width, depth, straightness of edge, flatness, and/or surface finish suitable for use as a vehicle component are envisioned.

The surface preparation process can include degreasing the metal substrate using an aqueous detergent such as Super Bee™ 400TG-ML, by Cee-Bee® in Cleveland, OH, according to ASTM D1730. For example, the metal substrate can be degreased at a temperature of about 60 °C to about 80 °C, e.g., about 60 °C to about 65 °C, about 65 °C to about 70 °C, about 70 °C to about 75 °C, or about 75 °C to about 80 °C, for a period of about 15 minutes to about 40 minutes, e.g., about 15 minutes to about 20 minutes, about 20 minutes to about 25 minutes, about 25 minutes to about 30 minutes, about 30 minutes to about 35 minutes, or about 35 minutes to about 40 minutes. The metal substrate can then be washed with a water rinse at a temperature of about 30 °C to about 20 °C, e.g., about 30 °C to about 35 °C, about 35 °C to about 40 °C, about 40 °C to about 45 °C, or about 45 °C to about 50 °C, for a period of about 1 minutes to about 8 minutes, e.g., about 1 minutes to about 3 minutes, about 3 minutes to about 5 minutes, about 5 minutes to about 7 minutes, or about 6 minutes to about 8 minutes.

The surface preparation process can include a chemical cleaning process such as an alkaline treatment process. For example, an alkaline solution such as Clean N' Prep, by Brulin in Indianapolis, IN, and/or Turco® 5578 by Henkel Technologies in Irvine, CA can be used to perform a chemical cleaning process on the metal substrate according to ASTM D2651. For example, the metal substrate can be treated at a temperature of about 60 °C to about 90 °C, e.g., about 60 °C to about 65 °C, about 65 °C to about 70 °C, about 70 °C to about 75 °C, about 75 °C to about 80 °C, about 80 °C to about 85 °C, or about 85 °C to about 90 °C, for a period of about 15 minutes to about 50 minutes, e.g., about 15 minutes to about 20 minutes, about 20 minutes to about 25 minutes, about 25 minutes to about 30 minutes, about 30 minutes to about 35 minutes, about 35 minutes to about 40 minutes, about 40 minutes to about 45 minutes, or about 45 minutes to about 50 minutes. The metal substrate can then be washed with a water rinse at a temperature of about 30 °C to about 20 °C, e.g., about 30 °C to about 35 °C, about 35 °C to about 40 °C, about 40 °C to about 45 °C, or about 45 °C to about 50 °C, for a period of about 1 minutes to about 8 minutes, e.g., about 1 minutes to about 3 minutes, about 3 minutes to about 5 minutes, about 5 minutes to about 7 minutes, or about 6 minutes to about 8 minutes.

The surface preparation process can include grit blasting the metal substrate. Grit blasting can include exposing the metal to about 140 grit to about 360 gritt of aluminum oxide, e.g., about 140 grit to about 160 grit, about 160 grit to about 180 grit, about 180 grit to about 200 grit, about 200 grit to about 220 grit, about 220 grit to about 240 grit, about 240 grit to about 260 grit, about 260 grit to about 280 grit, about 280 grit to about 300 grit, about 300 grit to about 320 grit, about 320 grit to about 340 grit, or about 340 grit to about 360 grit, at a pressure of about 20 psi to about 60 psi, e.g., about 20 psi to about 30 psi, about 30 psi to about 40 psi, about 40 psi to about 50 psi, or about 50 psi to about 60 psi. The metal substrate can then be exposed to an aqueous detergent cleaning solution to rinse the metal substrate, minimizing the presence of loosely adhered grit. Without being bound by theory, grit blasting the surface of the metal substrate can provide a stronger bond between the sol-gel and the metal substrate compared to acid etching due to the production of a macrorough surface. The grit blasted surface can hold the sol-gel on the surface longer during an ambient temperature flash, allowing a longer reaction time between the sol-gel and surface. Additionally, the grit blasted surface allow the sol-gel to react with a base of the substrate, reducing and/or eliminating reactions with a surface oxide on the substrate.

Additionally, and without being bound by theory, surface preparation of the metal substrate, e.g., a metal alloy of AlSi10Mg, can be performed to improve the bond between the metal alloy and the sol-gel. For example, cleaning the metal substrate can improve adhesion by removing contaminating films or soils that are blocking the bonding between the sol-gel and the surface. Further, desmutting, etching and/or deoxidation can be provided to chemically activate the surface. Such steps can be desirable for metallic surfaces having native oxide layers. These steps can be provided by any suitable method known for chemically or mechanically activating metallic surface in preparation for coating.

At operation 204, a sol-gel is disposed on the metal substrate. The sol-gel can include any of the sol-gels described herein. For example, the sol-gel can be disposed on the metal substrate by dipping, spraying, immersing, drenching, wiping, or coating the metal substrate in a dilute aqueous mixture of 3-glycidoxypropyltrimethoxysilane (GTMS) and tetra-n-propoxy zirconium (TPOZ) with an acetic acid catalyst to form a sol-gel on a surface of the metal substrate. For example, the silane can be applied to the sol-gel for a period of about 10 seconds to about 2 minutes, e.g., about 10 seconds to about 30 seconds, about 30 seconds to about 1 minute, about 1 minute to about 1.5 minutes, or about 1.5 minutes to about 2 minutes. Without being bound by theory, the treatment compound can increase adhesion between the sol-gel and the primer, as described below.

The sol-gel can be disposed on the metal substrate after about 1 hour to about 18 hours after the surface of the metal substrate has been prepared, e.g., about 1 hour to about 3 hours, about 3 hours to about 5 hours, about 5 hours to about 7 hours, about 7 hours to about 9 hours, about 9 hours to about 11 hours, about 11 hours to about 13 hours, about 13 hours to about 15 hours, about 15 hours to about 17 hours, about 17 hours to about 19 hours, about 19 hours to about 21 hours, about 21 hours to about 23 hours, about 23 hours to about 25 hours, or about 25 hours to about 28 hours. Without being bound by theory, by dispersing the sol-gel on the metal substrate at about 3 hours to about 5 hours, an increase in the bonding between the sol-gel and the metal substrate can occur, thereby increasing the average T-peel strength, lap shear strength, and metal to metal peel strength between the sol-gel and the metal substrate. Additionally, and without being bound by theory, by dispersing the sol-gel on the metal substrate after about 1 hour to about 18 hours, a reduction of surface oxide growth can occur, thereby promoting an increased in bond strength between the sol-gel and the metal substrate.

The sol-gel can be applied to the metal substrate by spraying the sol-gel using a high volume low pressure (HVLP spray gun) for a period of time of about 0.1 min to about 2 mi, e.g., about 0.1 min to about 0.5 min, about 0.5 min to about 1 min, about 1 min to about 1.5 min, or about 1.5 min to about 2 min. Furthermore, pot-life of the sol-gel is the period of time from the treatment until the primer is formed (e.g., the treatment compound becomes too viscous to be usable). The pot life can be from about 30 minutes to about 2 hours, such as from about 30 minutes to about 1 hour, about 1 hour to about 1.5 hours, or about 1.5 hours to about 2 hours. The sol-gel is allowed to drain from the metal substrate for a few minutes (e.g., 1-30 minutes, 1-10 minutes, or 3-10 minutes) and, if necessary, excess, undrained treatment component can be blotted off the metal substrate and/or gently blown off the metal substrate by compressed air.

In some aspects, which can be combined with other aspects, the metal substrate can be dip-coated by immersing the metal substrate in the aqueous mixture for about 5 minutes to about 40 minutes, e.g., about 5 minutes to about 10 minutes, about 10 minutes to about 15 minutes, about 15 minutes to about 20 minutes, about 20 minutes to about 25 minutes, about 25 minutes to about 30 minutes, about 30 minutes to about 35 minutes, or about 35 minutes to about 40 minutes, under ambient conditions. The metal substrate can then be dried at a temperature of about 100 °F to about 150 °F, e.g., about 100 °F to about 110 °F, about 110 °F to about 120 °F, about 120 °F to about 130 °F, about 130 °F to about 140 °F, or about 140 °F to about 150 °F. The metal substrate can be dried for a period of about 10 minutes to about 40 minutes, e.g., about 10 minutes to about 15 minutes, about 15 minutes to about 20 minutes, about 20 minutes to about 25 minutes, about 25 minutes to about 30 minutes, about 30 minutes to about 35 minutes, or about 35 minutes to about 30 minutes. The sol-gel is allowed to drain from the metal substrate for a few minutes (e.g., 1-30 minutes, 1-10 minutes, or 3-10 minutes) and, if necessary, excess, undrained sol-gel can be blotted off the metal substrate and/or gently blown off the metal substrate by compressed air.

In some aspects, which can be combined with other aspects, prehydrolysis of the surface of the metal substrate can be performed using steamy or hot water to activate the metal by populating the surface with chemisorbed water. The water on the surface can turn into surface hydroxyls which are available for condensation with the sol-gel, increasing the Zr—O—Al and/or Si—O—Al bonding matrix between the sol-gel and the metal substrate.

At operation 206, a resin is disposed on the sol-gel. The resin can include an epoxy resin, e.g., a polymeric phenolic epoxy resin such as BR® 127 by Solvay Chemicals, Inc., Princeton, NJ. Alternatively, the resin can include a resin that does not have chromium and/or chromates, e.g., BR® 6747-1 by Solvay Chemicals, Inc., Princeton, NJ. Without being bound by theory, the epoxy resin bonded to the sol-gel may allow for increased adhesion between a first metal substrate and a second substrate compared to adhesion between a first and metal substrate having no sol-gel. The resin can be disposed on the sol-gel after about 12 hours to about 24 hours after dispersing the sol-gel on the metal substrate, e.g., about 12 hours to about 14 hours, about 14 hours to about 16 hours, about 16 hours to about 18 hours, about 18 hours to about 20 hours, about 20 hours to about 22 hours, or about 22 hours to about 24 hours. For example, the resin can be disposed by spray and/or brush coating the resin on the sol-gel. The resin can include a thickness of about 0.00001 inches to about 0.0005 inches, e.g., about 0.00001 inches to about 0.00005 inches, about 0.00005 inches to about 0.0001 inches, or about 0.0001 inches to about 0.0005 inches. The resin may be dried at ambient temperatures following by curing for about 20 minutes to about 40 minutes at about 100 °C to about 140 °C, e.g., about 100 °C to about 110 °C, about 110 °C to about 120 °C, about 120 °C to about 130 °C, or about 130 °C to about 140 °C.

Without being bound by theory, by applying the resin to the sol-gel at about 15 hours to about 17 hours, an increase in the bonding between metal to metal peel strength between two or more substrates can occur. Without being bound by theory, the organometallic components in the sol-gel react with or bond to both the metal surface and the interfacing epoxy resin primer, thereby allowing for increased adhesion between the epoxy resin and the metal substrate. Some mechanical interaction can also result from the surface porosity and microstructure. Generally, the zirconium component bonds covalently with the metal, while the glycidoxysilane or hydroxyl organosilane bonds with the epoxy resin. Accordingly, the sol-gel process can orient the sol coating having a metal-to-epoxy gradient on the surface.

The sol-gel coating can be cured by drying the sol-gel coating disposed on the metal substrate. The curing can be performed under ambient conditions, at room temperature, and/or at elevated temperature. A curing temperature can be from about 10 °C to about 150 °C, such as from about 20 °C to about 100 °C, such as from about 30 °C to about 70 °C, such as from about 40 °C to about 50 °C. In some aspects, which can be combined with other aspects, curing can be performed for a period of time, such as from about 1 minute to about 48 hours, such as from about 5 minutes to about 24 hours, such as from about 10 minutes to about 8 hours, such as from about 30 minutes to about 4 hours, for example about 1 hour.

After operation 206 and/or curing, the sol-gel coating can be suitable for exposure to an external environment and/or for application of a secondary substrate coated with a sol-gel coating described herein to be adhered to and/or bonded to the metal substrate. For example, the secondary substrate coated with a sol-gel coating described herein can be oriented such that the resin disposed on the sol-gel of the metal substrate interacts with a resin disposed on a sol-gel of the secondary substrate. The secondary substrate can be a metal substrate and/or an organic material such as a polymer coated with the sol-gel coating described herein. The secondary substrate can be adhered to or bonded to the sol-gel coating before curing is completely finished, for example, depositing the secondary substrate is performed at least partially concurrently with the curing. A pressure of about −10 psi to about 100 psi may be introduced to hold the metal substrate and the secondary substrate together.

EXAMPLES

Screening studies were conducted on test panels of 2024-T3 aluminum sized 4 inches (")×1"×0.063" having a straightness of edge within 0.015", a flatness within 0.012", and a surface finish of 63 microinches or finer. The test panels were initially prepared by degreasing the surface with an aqueous detergent, grit blasting the test panels with #180 grit alumina, and followed by a final aqueous detergent cleaning to minimize the presence of loosely adhered grit, as described above. A dilute aqueous mixture of 3-glycidoxypropyltrimethoxysilane (GTMS) and tetra-n-propoxyzirconium (TPOZ) with an acetic acid catalyst was used as the sol-gel mixture. The panels were spray-coated with the sol-gel mixture within 1 to 15 hours of grit blasting the metal substrate. The panels were drained and dried followed by application of a paste adhesive such as Loctite @EA 9394, EA 9396, EA 9309NA, or EA 9360, of Rocky Hill, CT, or polymeric phenolic epoxy resin such as BR® 127 by Solvay Chemicals, Inc., Princeton, NJ, within 1 to 18 hours of the sol-gel mixture application. Two sol-coated panels were then bonded together to form an adhesive lap joint using the adhesive primer. Panels were bonded together to form a 5 mil bond line thickness for adhesives of EA 9394 and EA 9396, while panels were bonded together to form a 23 mil bond line thickness for EA 9309NA and EA 9360.

A first sol-gel coated panel was spray-coated with the sol-gel mixture 1 hour after grit blasting the metal substrate and subsequently treated with a primer adhesive 1 hour after of sol-gel application (Example 1). A second sol-gel coated panel was spray-coated with the sol-gel mixture 15 hours after of grit blasting the metal substrate and subsequently treated with a primer adhesive 1 hour after of sol-gel application (Example 2). A third sol-gel coated panel was spray-coated with the sol-gel mixture 1 hour after of grit blasting the metal substrate and subsequently treated with a primer adhesive 18 hours after of sol-gel application (Example 3).

The average T-peel strength was measured for each of Example 1, Example 2, and Example 3 according to ASTM D1876, when using a film adhesive of Metlbond® 1146-3 by Solvay Chemicals, Inc., Princeton, NJ where Example 2 resulted in the greatest average T-peel strength of 31 pounds per inch width (piw), as shown in Table 1.

TABLE 1

| Example | Average T-Peel Strength (piw) | Failure Mode | Average Primer Thickness (mils) |
|---|---|---|---|
| 1 | 29 | 100% cohesive | 0.52 |
| 2 | 31 | 100% cohesive | 0.41 |
| 3 | 28 | 100% cohesive | 0.61 |

Lap shear strength was measured for each of Example 1, Example 2, and Example 3, according to ASTM D1002, when using a paste adhesive of Loctite® EA 9394, of Rocky Hill, CT, where Example 2 resulted in the greatest lap shear strength of 3762 psi, as shown in Table 2.

TABLE 2

| Example | Average Lap Shear Strength (psi) | Failure Mode | Average Primer Thickness (mils) |
|---|---|---|---|
| 1 | 3715 | 100% primer | 0.49 |
| 2 | 3762 | 90% cohesive | 0.46 |
| 3 | 3727 | 95% cohesive | 0.55 |

Lap shear strength was measured for each of Example 1, Example 2, and Example 3, according to ASTM D1002, when using a paste adhesive of Loctite® EA 9396, of Rocky Hill, CT, where Example 2 resulted in the greatest lap shear strength of 4836 psi, as shown in Table 3.

TABLE 3

| Example | Average Lap Shear Strength (psi) | Failure Mode | Average Primer Thickness (mils) |
|---|---|---|---|
| 1 | 4466 | 100% primer | 0.49 |
| 2 | 4836 | 100% primer | 0.46 |
| 3 | 4428 | 100% primer | 0.55 |

Figure 3:
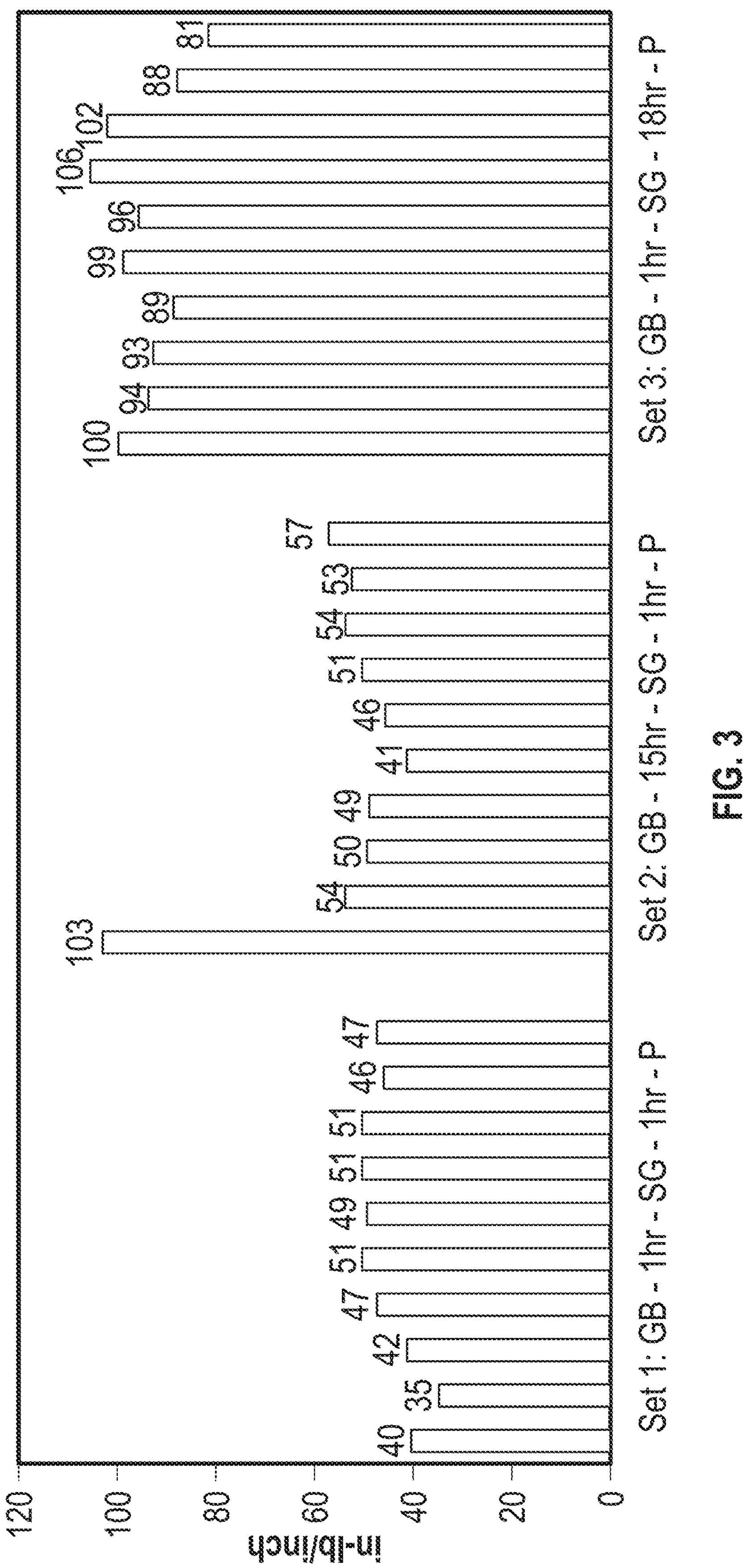
FIG. 3 is a graph illustrating a peel strength of 2024 aluminum alloy according to aspects of the disclosure.

Metal to metal peel strength was measured for each of Example 1, Example 2, and Example 3, according to ASTM D1781, when using a polymeric phenolic epoxy resin of BR®127 by Solvay Chemicals, Inc., Princeton, NJ, where Example 3 resulted in the greatest metal-to-metal peel strength of 94.56 inch pounds per inch, as shown in Table 4 and FIG. 3.

| Set | Average Peel Torque (in. lbs/in | 0.020" Adherend avg. primer thickness (mils) | 0.040" Adherend avg. primer thickness (mils) |
|---|---|---|---|
| 1 | 45.84 | 0.33 | 0.37 |
| 2 | 55.73 | 0.31 | 0.34 |
| 3 | 94.56 | 0.33 | 0.43 |

Figure 4:
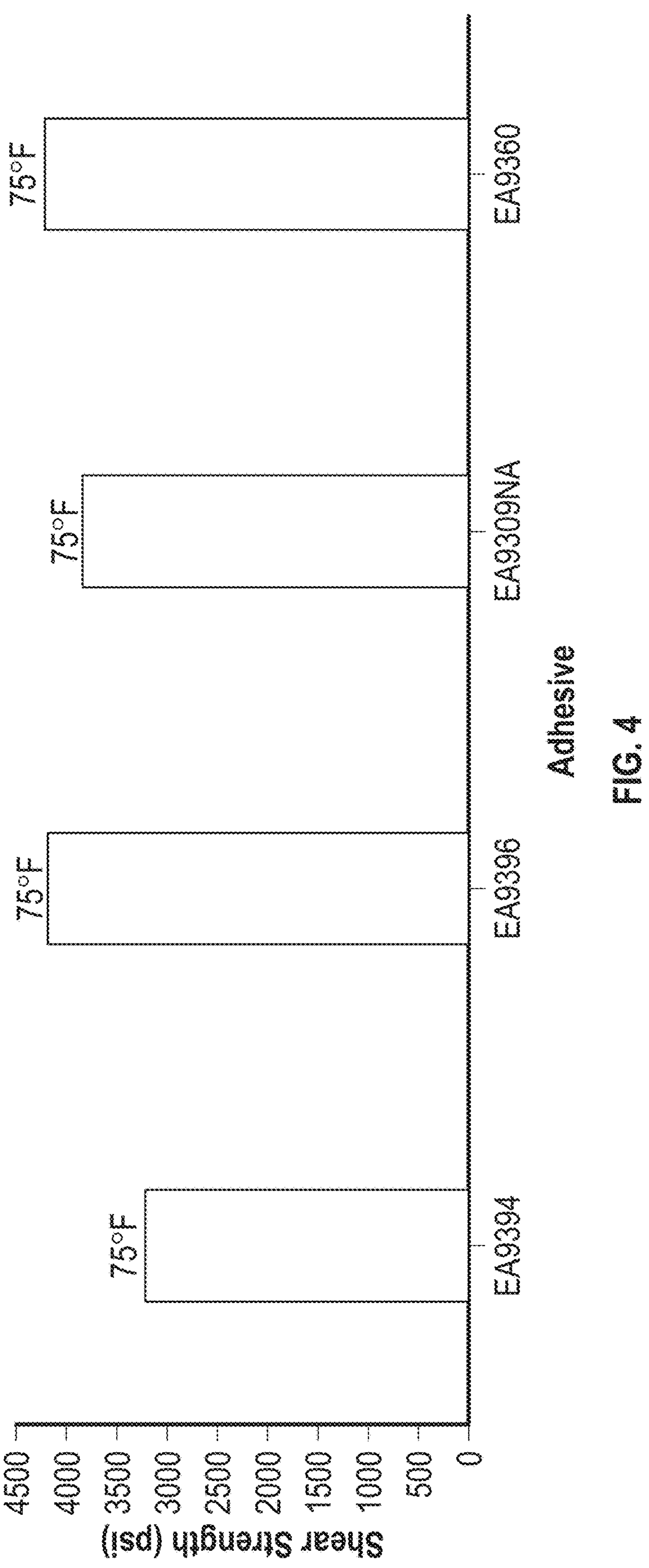
FIG. 4 is a graph illustrating an average single lap shear strength of AlSi10Mg aluminum alloys having a 5 mil bond line according to aspects of the disclosure.

Single Lap shear strength was measured for each of twelve test panels coated with polymeric phenolic epoxy resin of BR® 127 by Solvay Chemicals, Inc., Princeton, NJ, and bonded with each of EA 9394, EA 9396, EA 9309NA, or EA 9360 according to ASTM D1002 at room temperature, as shown in FIG. 4. A bond line thickness of 5 mils was utilized. The average single lap shear strength remaining above 3000 psi for all test panels at room temperature, as shown in FIG. 4.

Figure 5:
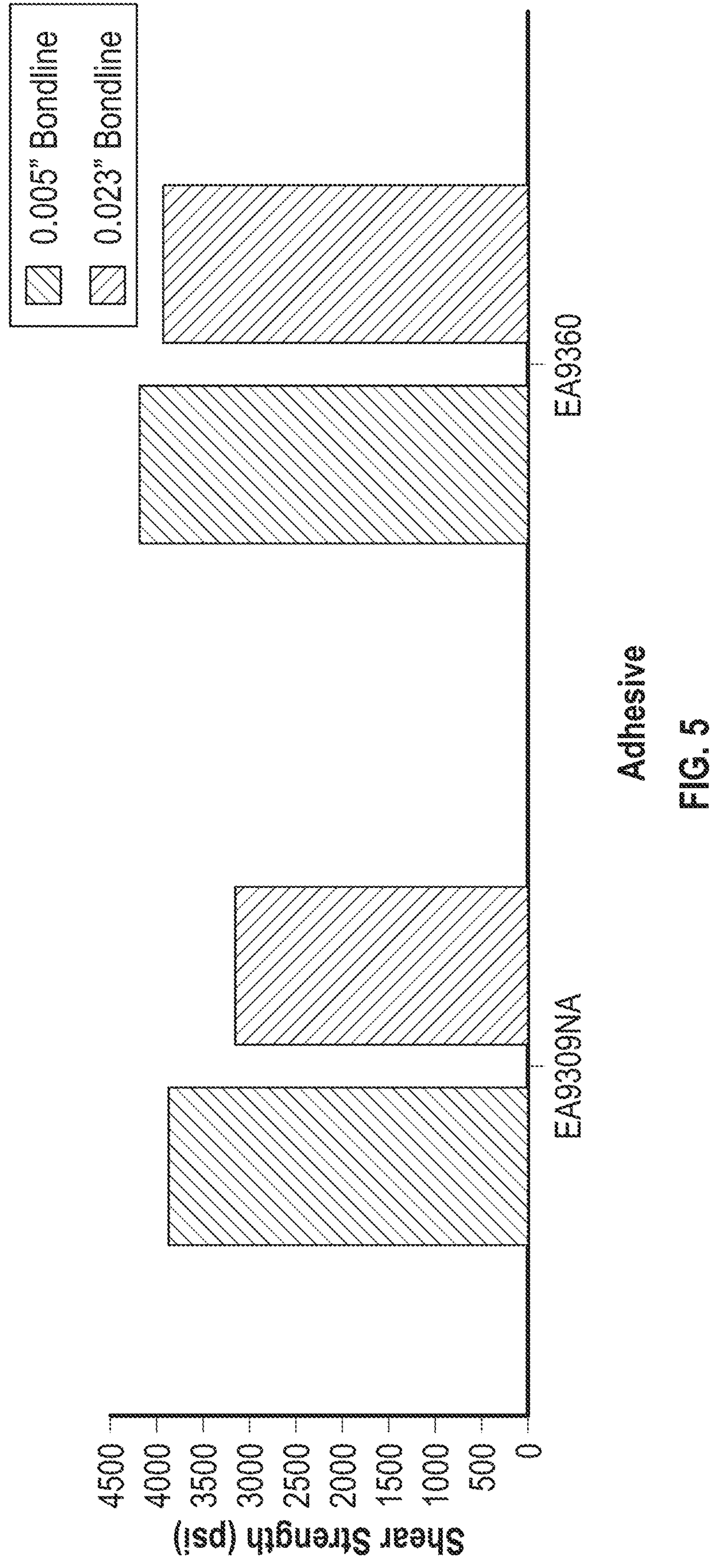
FIG. 5 is a graph illustrating an average single lap shear strength of AlSi10Mg aluminum alloys having a 5 mil or a 23 mil bond line according to aspects of the disclosure.

Single Lap shear strength was measured for each of twelve test panels coated with polymeric phenolic epoxy resin of BR® 127 by Solvay Chemicals, Inc., Princeton, NJ, and bonded with each of EA 9309NA and EA 9360 according to ASTM D1002, as shown in FIG. 5. A bond line thickness of 5 mils and 23 mils were utilized. The EA 9309NA coated test panels had an 18% knockdown for 23 mil bond line compared to 5 mil bond line single lap, 3156 psi compared to 3859 psi respectively, as shown in FIG. 5. The EA 9360 coated test panels had a 7% knockdown for 23 mil bond line compared to 5 mil bond line single lap, 3929 psi compared to 4211 psi respectively, as shown in FIG. 5.

Figure 6:
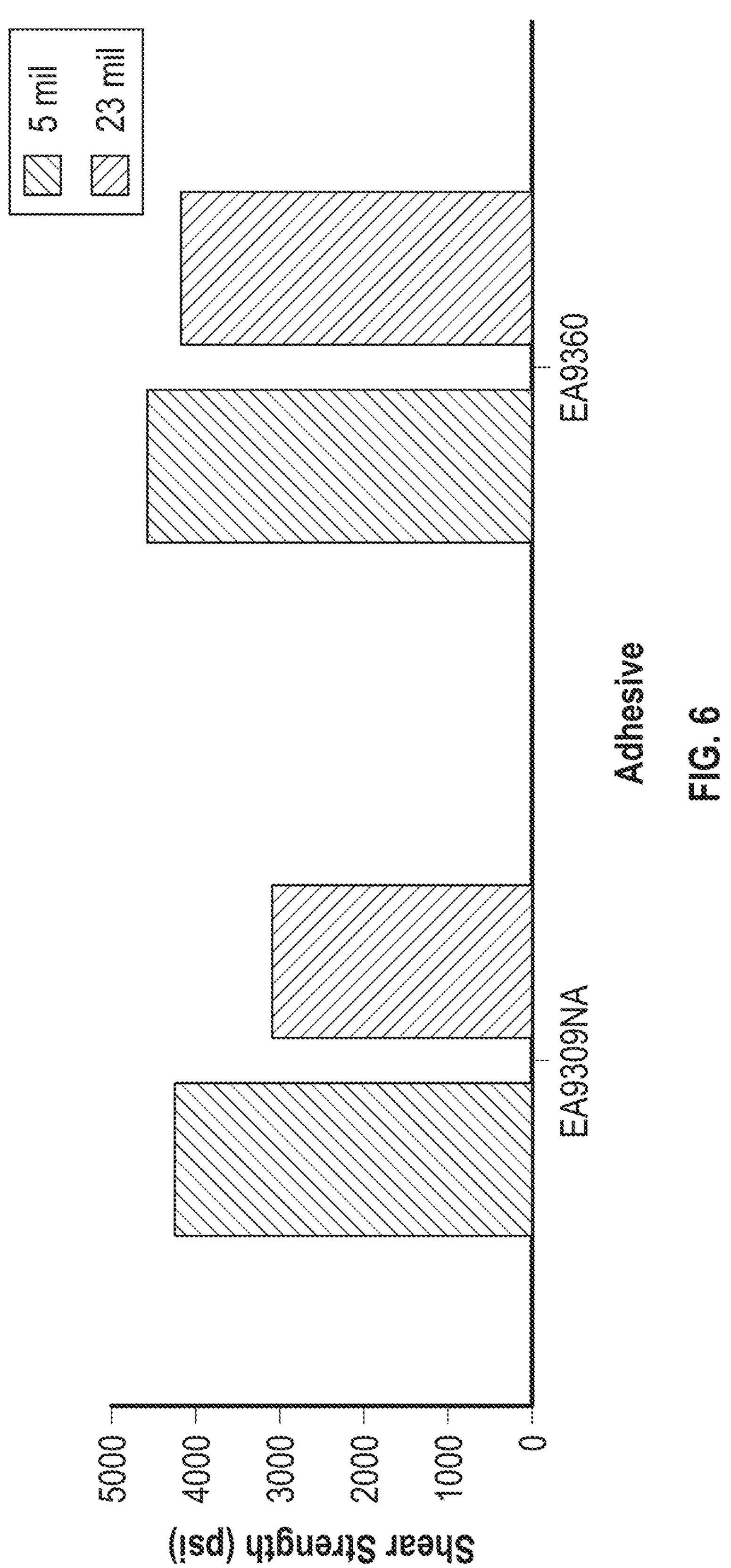
FIG. 6 is a graph illustrating an average double lap shear strength of AlSi10Mg aluminum alloys having a 5 mil or a 23 mil bond line according to aspects of the disclosure.

Double Lap shear strength was measured for each of eight test panels coated with polymeric phenolic epoxy resin of BR® 127 by Solvay Chemicals, Inc., Princeton, NJ, and bonded with each of EA 9309NA and EA 9360 according to ASTM 3528-96(2016), as shown in FIG. 6. A bond line thickness of 5 mils and 23 mils were utilized. The EA 9309NA coated test panels had an 27% knockdown for 23 mil bond line compared to 5 mil bond line single lap, 3083 psi compared to 4562 psi respectively, as shown in FIG. 6. The EA 9360 coated test panels had a 9% knockdown for 23 mil bond line compared to 5 mil bond line single lap, 4153 psi compared to 4562 psi respectively, as shown in FIG. 6.

Figure 7:
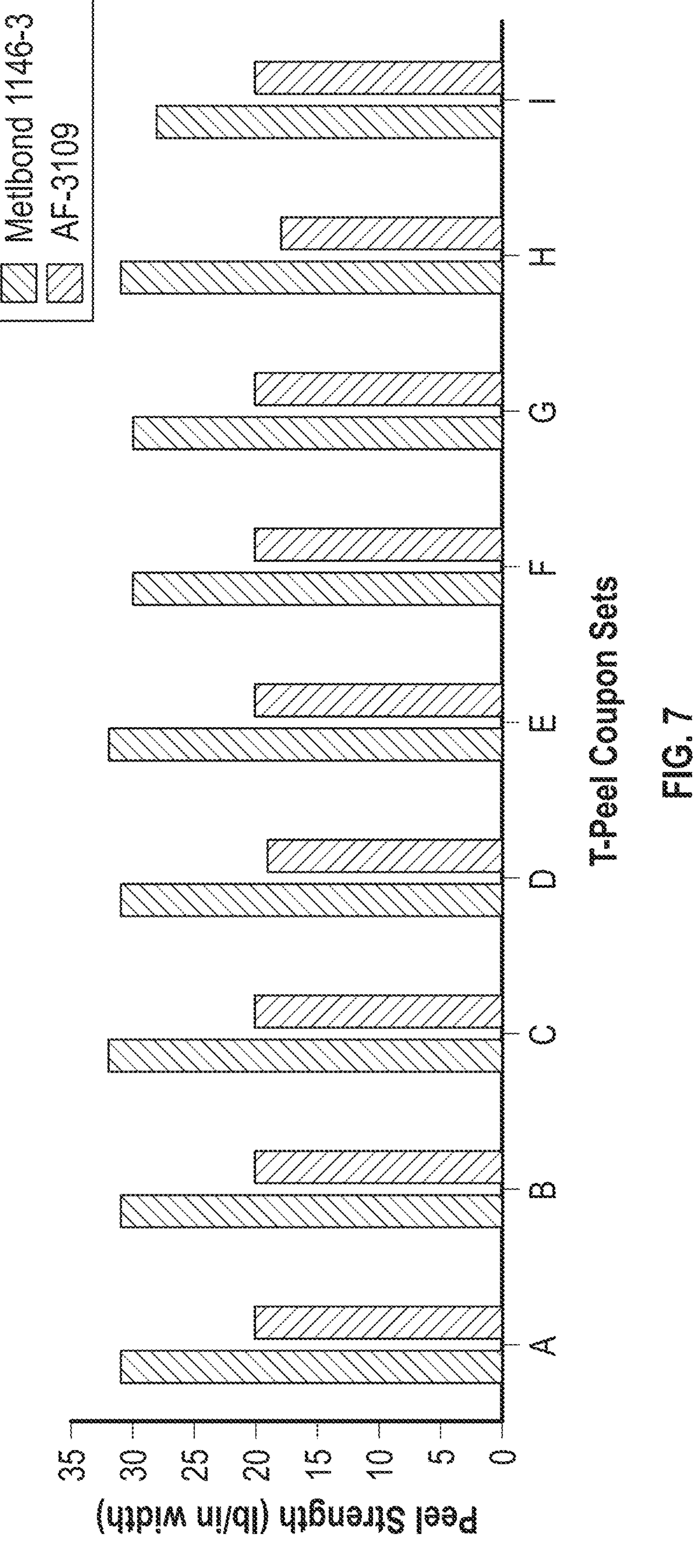
FIG. 7 is a graph illustrating an average T-peel strength of 2024 aluminum alloy according to aspects of the disclosure.

T-peel strength results were measured for each of five T-peel panels coated with polymeric phenolic epoxy resin of BR® 127 by Solvay Chemicals, Inc., Princeton, NJ, and bonded bonded with each of Metlbond® 1146-3 by Solvay Chemicals, Inc., Princeton, NJ, and AF 3109 by 3M™ at St. Paul MN, according to ASTM D 1876, as shown in FIG. 7. Each of the panels coated with Metlbond® 1146-3 or AF 3109 resulted in average peel strength values comparable to etched and primed panels with respective adhesives, as shown in FIG. 7.

A wedge test was performed according to ASTM D3762 with exposure at 120±10 °F and greater than 95% to 100% relative humidity for 70±10 minutes of test panels bonded with BF Goodrich A-1177-B2 adhesive conforming MMM-A-134, Type I. Crack growth propagation was found to be less than 5 mils after exposure to <0.005" after exposure to 120±10 °F and 95 to 100 percent relative humidity for 70±10 minutes.

Figures 8A, 8B:
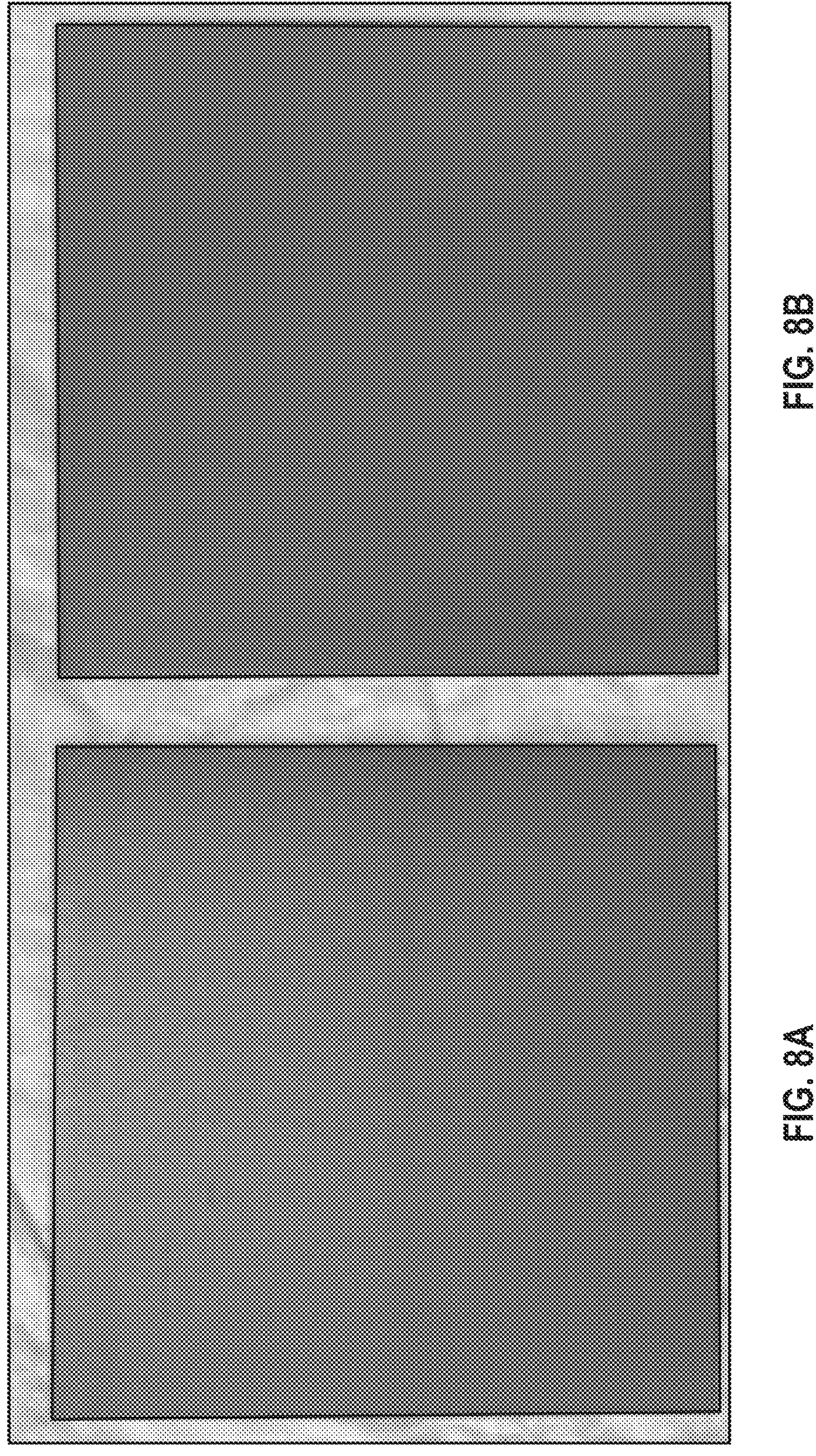
FIGS. 8A and 8B are pictures illustrating test panels before a thermal shock test and after a thermal shock test according to aspects of the disclosure.

A thermal shock test was performed by thermally shocking test panels coated with sol-gels and overcoated with BR® 127 by Solvay Chemicals, Inc., Princeton, NJ of the present disclosure for a total of 200 cycles from −192 °C to 177 °C, where dwell time was determined by the temperature of the panels. No peeling or delamination of the primer was found after 200 cycles of thermally shocking the test panels, as shown in FIGS. 8A and 8B.

Outgas testing of test panels coated with a sol-gel coating and overcoated with BR®127 by Solvay Chemicals, Inc., Princeton, NJ as described herein (Example 1) were compared to test panels treated only with BR® 127 by Solvay Chemicals, Inc., Princeton, NJ, according to ASTM E595 (Reference). The test panels coated with a sol-gel coating and BR® 127 were found to have less total mass loss (TML, %), collected volatile condensable materials (CVCM, %), and water vapor regained (WVR, %) than a test panel only coated with BR® 127, as shown below in Table 5.

TABLE 5

| Sample | Example 1 | Reference |
|---|---|---|
| Avg. TML, % | 1.171 | 1.506 |
| Avg. CVCM, % | 0.002 | 0.006 |
| WVR, % | 0.498 | 0.818 |
| TML − WVR, % | 0.673 | 0.688 |

Additional Aspects

The present disclosure provides, among others, the following embodiments, each of which may be considered as optionally including any alternate embodiments.

E1. A method for enhancing adhesion between an additively manufactured aluminum alloy and an epoxy primer, the method including performing a surface preparation process on a metal substrate including an aluminum alloy including a columnar structure including an α-aluminum matrix at least partially surrounded by a silicon phase; dispersing a sol-gel on a surface of the metal substrate; and dispersing a primer on the sol-gel to form a sol-gel coating on the metal substrate.

E2. The method of embodiment E1, in which the aluminum alloy includes AlSi10Mg or SC—Al—Mg.

E3. The method of embodiment E1 or E2, in which performing the surface preparation process includes grit blasting the metal substrate with about 140 grit to about 360 grit aluminum oxide at a pressure of about 20 psi to about 60 psi.

E4. The method of embodiment E3, in which performing the surface preparation process includes degreasing the metal substrate using an aqueous detergent at a temperature of about 60 °C to about 80 °C for a period of about 15 minutes to about 40 minutes E5. The method of any one of embodiments E1-E4, in which dispersing the sol-gel to the surface of the metal substrate occurs after about 1 hour to about 18 hours after performing the surface preparation process on the metal substrate.

E6. The method of any one of embodiments E1-E5, in which dispersing the sol-gel to the surface includes immersing the metal substrate in an aqueous mixture including an organosilane, a zirconium alkoxide, and an organic acid.

E7. The method of embodiment E6, in which the organosilane includes 3-glycidoxypropyltrimethoxysilane; the zirconium alkoxide includes tetra-n-propoxy zirconium; and the organic acid includes acetic acid.

E8. The method of any one of embodiments E1-E7, in which dispersing the resin occurs after about 12 hours to about 24 hours after priming the sol-gel coating.

E9. The method of any one of embodiments E1-E8, further including curing the sol-gel coating at a curing temperature of about 10 °C to about 150 °C for a period of about 1 minute to about 48 hours.

E10. The method of any one of embodiments E1-E9, further including adhering a secondary substrate to the sol-gel coating.

E11. The method of embodiment E10, in which the secondary substrate includes a polymer.

E12. A vehicle component including: a sol-gel coating system, including: a metal substrate including AlSi10Mg or Sc—Al—Mg; and a sol-gel disposed on the metal substrate, in which the sol-gel is a reaction product of: an organosilane; a zirconium alkoxide, and an organic acid.

E13. The component of embodiment E12, in which the metal substrate includes AlSi10Mg.

E14. The component of embodiment E12 or E13, in which: the organosilane includes 3-glycidoxypropyltrimethoxysilane; the zirconium alkoxide includes tetra-n-propoxy zirconium; and the organic acid includes acetic acid.

E15. An assembly adhesively bonded with a resin, including: at least two metal substrates aligned to define a bond line; a sol-gel coating disposed between the at least two metal substrates along the bond line, the coating including a reaction product of an organosilane, a zirconium alkoxide, and an organic acid; and; an epoxy adhesive connecting the at least two metal substrates along the bond line.

E16. The assembly of embodiment E15, in which the bond line includes a 5 mil bond line.

E17. The assembly of embodiment E15 or E16, in which the bond line includes a 23 mil bond line.

E18. The assembly of any one of embodiments E15-E17, in which the at least two metal substrates comprise AlSi10Mg or Sc—Al—Mg.

E19. The assembly of any one of embodiments E15-E18, in which: the organosilane includes 3-glycidoxypropyltrimethoxysilane; the zirconium alkoxide includes tetra-n-propoxy zirconium; and the organic acid includes acetic acid.

E20. The assembly of any one of embodiments E15-E19, in which the assembly has: a T-peel strength of about 28 pounds per inch width (piw) to about 31 piw; a lap shear strength of about 3715 psi to about 4836 psi; and a metal to metal peel strength of about 45 inch pounds per inch (in.lbs/in) to about 96 in.lbs/in.

Overall, the present disclosure can provide methods of producing additive manufacturing aluminum alloys, e.g., AlSi10Mg, having similar strength to conventional aluminum components, without the need for hazardous facilities, e.g., acid etching facilities. The additive manufactured aluminum alloys can be produced such that complex component geometries can be provided, e.g., complex bracket geometries for the bonded socket joints with composite tubes, in a shorter period of time than conventional aluminum alloy production processes. Additionally, by treating the additive manufactured aluminum alloys with a sol-gel of the present disclosure, a reduction of smutting of the additive manufactured aluminum alloys can occur, increasing the compatibility between the aluminium alloy and the primer disposed on the aluminium alloy. By reducing the smutting of the additive manufactured aluminium alloys, an increase in the robustness and reliability of the surface oxide structure growth needed for mechanical interlocking of the primer to the aluminium alloy can occur.

In the current disclosure, reference is made to various aspects. However, it should be understood that the present disclosure is not limited to specific described aspects. Instead, any combination of the features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects can achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The terms "comprising", "comprise" and "comprises" herein are intended to be optionally substitutable with the terms "consisting essentially of", "consist essentially of", "consists essentially of", "consisting of", "consist of" and "consists of", respectively, in every instance.

The use of headings is for purposes of convenience only and does not limit the scope of the present disclosure. Aspects described herein can be combined with other aspects.

While the foregoing is directed to aspects of the present disclosure, other and further aspects of the disclosure can be devised without departing from the basic scope thereof, and the scope thereof is determined by the claims that follow. Furthermore, while the foregoing is directed to substrates, such as aircraft substrates, such as panels, coated lap joints between two or more panels, and wing-to-fuselage assemblies, aspects of the present disclosure can be directed to other substrates not associated with an aircraft, such as a multicomponent substrates used in aerospace, automotive, marine, energy industry, and the like.

What is claimed is:

1. A method for enhancing adhesion between an additively manufactured aluminum alloy substrate and an epoxy primer, the method comprising:

performing a surface preparation process on the additively manufactured aluminum alloy substrate comprising an aluminum alloy comprising a columnar structure comprising an α-aluminum matrix at least partially surrounded by a silicon phase, wherein performing the surface preparation process comprises grit blasting the additively manufactured aluminum alloy substrate with about 140 grit to about 360 grit aluminum oxide at a pressure of about 20 psi to about 60 psi;

dispersing a sol-gel on a surface of the additively manufactured aluminum alloy substrate, wherein the sol-gel comprises a glycidoxy-silane; and dispersing the epoxy primer on the sol-gel, wherein dispersing the sol-gel to the surface of the additively manufactured aluminum alloy substrate occurs after about 1 hour to about 18 hours after performing the grit blasting on the additively manufactured aluminum alloy substrate.

2. The method of claim 1, wherein the aluminum alloy comprises AlSi10Mg or Sc—Al—Mg.

3. The method of claim 1, wherein performing the surface preparation process further comprises degreasing the additively manufactured aluminum alloy substrate using an aqueous detergent at a temperature of about 60 °C to about 80 °C for a period of about 15 minutes to about 40 minutes.

4. The method of claim 1, wherein dispersing the sol-gel to the surface comprises immersing the additively manufactured aluminum alloy substrate in an aqueous mixture comprising:

a glycidoxy-silane;

a zirconium alkoxide, and an organic acid.

5. The method of claim 4, wherein:

the glycidoxy-silane comprises 3-glycidoxypropyltrimethoxysilane;

the zirconium alkoxide comprises tetra-n-propoxy zirconium; and the organic acid comprises acetic acid.

6. The method of claim 1, wherein dispersing the epoxy primer occurs after about 12 hours to about 24 hours after priming the sol-gel coating.

7. The method of claim 1, further comprising curing the sol-gel coating at a curing temperature of about 10 °C to about 150 °C for a period of about 1 minute to about 48 hours.

8. The method of claim 1, further comprising adhering a secondary substrate to the sol-gel coating.

9. The method of claim 8, wherein the secondary substrate comprises a polymer.

10. The method of claim 1, wherein the glycidoxy-silane comprises 3-glycidoxypropyltrimethoxysilane.

11. The method of claim 1, wherein the aluminum alloy comprises AlSi10Mg.

12. The method of claim 1, wherein the sol-gel is applied within about 4 hours of grit blasting the additively manufactured aluminum alloy substrate.

13. The method of claim 1, further comprising aligning the additively manufactured aluminum alloy with another metal substrate to define a bond line and applying the primer along the bond line to form a bonded assembly.

14. The method of claim 13, wherein the bond line comprises a 5 mil bond line.

15. The method of claim 13, wherein the bond line comprises a 23 mil bond line.

16. The method of claim 13, wherein the sol-gel comprises 3-glycidoxypropyltrimethoxysilane, tetra-n-propoxy zirconium, and acetic acid.

17. The method of claim 13, wherein the bonded assembly has:

a T-peel strength of about 28 pounds per inch width (piw) to about 31 piw;

a lap shear strength of about 3715 psi to about 4836 psi; and a metal-to-metal peel strength of about 45 inch-pounds per inch (in.lbs/in) to about 96 in.lbs/in.

18. A method for enhancing adhesion between an additively manufactured aluminum alloy substrate and a primer, the method comprising:

grit blasting the additive manufactured aluminum alloy substrate comprising aluminum alloy comprising a columnar structure comprising an α-aluminum matrix at least partially surrounded by a silicon phase;

dispersing a sol-gel on a surface of the grit blasted aluminum alloy substrate, wherein dispersing the sol-gel to the surface of the grit blasted aluminum alloy substrate occurs after about 1 hour to about 18 hours after performing the grit blasting; and dispersing the primer on the sol-gel.

19. The method of claim 18, wherein dispersing the sol-gel to the surface of the grit blasted aluminum alloy substrate occurs after about 1 hour to about 5 hours after grit blasting the aluminum alloy substrate.

20. The method of claim 18, wherein dispersing the primer on the sol-gel occurs after about 12 hours to about 24 hours after priming the sol-gel coating.

* * * * *